(12) United States Patent
Suganuma

(10) Patent No.: US 10,712,803 B2
(45) Date of Patent: Jul. 14, 2020

(54) POWER SUPPLY SYSTEM, POWER RECEIVING DEVICE AND POWER SUPPLY DEVICE

(71) Applicant: Renesas Electronics Corporation, Tokyo (JP)

(72) Inventor: Satomi Suganuma, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 106 days.

(21) Appl. No.: 15/947,987

(22) Filed: Apr. 9, 2018

(65) Prior Publication Data

US 2018/0341315 A1  Nov. 29, 2018

(30) Foreign Application Priority Data

May 24, 2017 (JP) ................................ 2017-102702

(51) Int. Cl.
| | |
|---|---|
| G06F 13/40 | (2006.01) |
| G06F 11/30 | (2006.01) |
| G06F 1/26 | (2006.01) |
| G06F 1/3234 | (2019.01) |
| G06F 13/362 | (2006.01) |

(52) U.S. Cl.
CPC ............ *G06F 1/3253* (2013.01); *G06F 1/266* (2013.01); *G06F 13/362* (2013.01); *G06F 2213/0042* (2013.01)

(58) Field of Classification Search
CPC ............. G06F 13/40; G06F 11/30; G06F 1/26
See application file for complete search history.

(56) References Cited

U.S. PATENT DOCUMENTS

| | | | | |
|---|---|---|---|---|
| 2013/0033107 | A1* | 2/2013 | Nakagai | G06F 1/266 |
| | | | | 307/38 |
| 2016/0336761 | A1* | 11/2016 | Hsu | H02J 7/0029 |
| 2016/0336779 | A1* | 11/2016 | Hu | H02J 7/0052 |
| 2017/0293335 | A1* | 10/2017 | Dunstan | G06F 1/266 |
| 2018/0018934 | A1* | 1/2018 | Lim | G06F 13/4068 |
| 2018/0069395 | A1* | 3/2018 | Morii | G01R 31/42 |

OTHER PUBLICATIONS

Universal Serial Bus Type-C Cable and Connector Specification, Revision/Release 1.2, Mar. 25, 2016, pp. 1-221.
Universal Serial Bus Power Delivery Specification, Revision 3.0, V1.0a, Mar. 25, 2016, pp. 1-513.

* cited by examiner

*Primary Examiner* — David E Martinez
(74) *Attorney, Agent, or Firm* — McDermott Will & Emery LLP

(57) ABSTRACT

To start power supply at a high current without applying USB Power Delivery, a power supply system includes a power supply device having a first USB connector conforming to the USB Type-C standard, and a power receiving device having a second USB connector conforming to the USB Type-C standard. The second USB connector includes a high current notification pin for notifying that it is possible to receive power at a high current greater than a predetermined reference current. When the second USB connector is coupled to the first USB connector, the power receiving device notifies the power supply device of the fact that it is possible to receive power at a high current greater than the predetermined reference current, through the high current notification pin. When receiving the notification, the power supply device determines that it is possible to start power supply to the receiving device at a high current.

9 Claims, 15 Drawing Sheets

| A-ROW PIN NUMBERS | A1 | A2 | A3 | A4 | A5 | A6 | A7 | A8 | A9 | A10 | A11 | A12 |
|---|---|---|---|---|---|---|---|---|---|---|---|---|
| | GND | TX1+ | TX1- | VBUS | CC1 | D+ | D- | SBU1 | VBUS | RX2- | RX2+ | GND |
| | GND | RX1+ | RX1- | VBUS | SBU2 | D- | D+ | CC2 | VBUS | TX2- | TX2+ | GND |
| B-ROW PIN NUMBERS | B12 | B11 | B10 | B9 | B8 | B7 | B6 | B5 | B4 | B3 | B2 | B1 |

| A-ROW PIN NUMBERS | A12 | A11 | A10 | A9 | A8 | A7 | A6 | A5 | A4 | A3 | A2 | A1 |
|---|---|---|---|---|---|---|---|---|---|---|---|---|
| | GND | RX2+ | RX2- | VBUS | SBU1 | D+ | D- | CC | VBUS | TX1- | TX1+ | GND |
| | GND | TX2+ | TX2- | VBUS | VCONN | D- | D+ | SBU2 | VBUS | RX1- | RX1+ | GND |
| B-ROW PIN NUMBERS | B1 | B2 | B3 | B4 | B5 | B6 | B7 | B8 | B9 | B10 | B11 | B12 |

FIG. 8

| PORT NUMBER | SIGNAL PIN NAME (SIGNAL PIN NUMBER) | | VBUS PIN NUMBER |
|---|---|---|---|
| | WHEN CC1 DETECTS RESISTANCE | WHEN CC2 DETECTS RESISTANCE | |
| 1 | TX2+(B2) | TX1+(A2) | A4 |
| 2 | TX2-(B3) | TX1-(A3) | B9 |
| 3 | RX2+(A11) | RX1+(B11) | A9 |
| 4 | RX2-(A10) | RX1-(B10) | B4 |

FIG. 9

| PORT NUMBER | SIGNAL PIN NAME (SIGNAL PIN NUMBER) | VBUS PIN NUMBER |
|---|---|---|
| 1 | TX2+(B2) | A4 |
| 2 | TX2-(B3) | B9 |
| 3 | RX2+(A11) | A9 |
| 4 | RX2-(A10) | B4 |

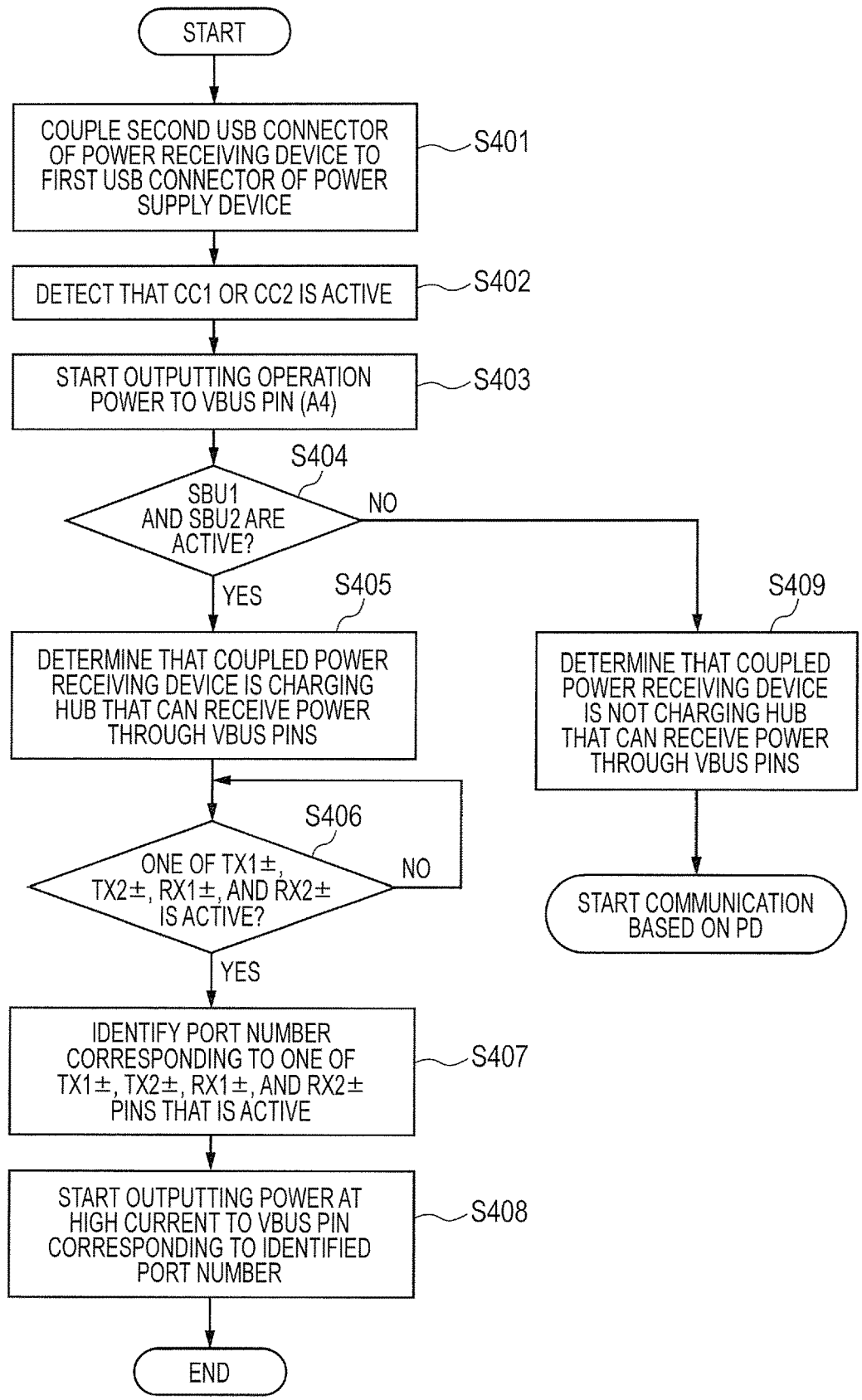

POWER SUPPLY SYSTEM, POWER RECEIVING DEVICE AND POWER SUPPLY DEVICE

CROSS-REFERENCE TO RELATED APPLICATIONS

The disclosure of Japanese Patent Application No. 2017-102702 filed on May 24, 2017 including the specification, drawings and abstract is incorporated herein by reference in its entirety.

BACKGROUND

The present invention relates to a power supply system. More specifically, the present invention relates to a power supply system for charging through a connector that conforms to the USB Type-C (registered trademark) standard.

The USB Type-C standard, which is a standard for next-generation USB (Universal Serial Bus) connectors, is expected to be widely used in the future in markets. As method and system for charging next-generation secondary batteries using a connector that conforms to the USB Type-C standard (Non-Patent Document 1: Universal Serial Bus Type-C Cable and Connector Specification Revision 1.2 Mar. 25, 2016), a standard called USB Power Delivery (hereinafter, referred to as PD) is established (Non-Patent Document 2: Universal Serial Bus Power Delivery Specification Revision 3.0, V1.0a. 25 Mar. 2016). In PD, the power that can be supplied significantly increases by up to 100 W from 7.5 W (5 V, 1.5 A) of the USB battery charging standard, which is called USB Battery Charging Specification 1.2 (hereinafter, referred to as BC 1.2). More specifically, in PD, supplying a voltage higher than 5 V (more specifically, 12 V, 20 V) is allowed as a bus voltage VBUS through a VBUS line. In addition, supplying a charging current greater than BC 1.2 (more specifically, 2 A, 3 A, 5 A) is also allowed.

SUMMARY

In PD in described in Non-Patent Document 2, it is necessary to implement a controller IC (Integrated Circuit) having a function of controlling power supply or power receiving in accordance with PD, in both a power supply device (Source) and a power receiving device (Sink). However, of the power receiving devices with a connector that conforms to the USB Type-C standard described in Non-Patent Document 1, there are ones that do not have the PD-based controller IC. In this case, the power supply device supplies power with a current (1.5 A) specified in BC 1.2, so that the power receiving device may not receive power with a high current exceeding this current.

The above and other objects and novel features of the present invention will become apparent from the description of the present specification and the accompanying drawings.

According to an embodiment, a power supply system includes a power supply device including a first USB connector that conforms to the USB Type-C standard, and a power receiving device including a second USB connector that conforms to the USB Type-C standard. The second USB connector includes a high current notification pin to notify that it is possible to receive power with a high current greater than a predetermined reference current. When the second USB connector is couple to the first USB connector, the power receiving device notifies the power supply device of the fact that it is possible to receive power with a high current greater than the predetermined reference current, through the high current notification pin. When receiving the notification from the power receiving device indicating that it is possible to receive power at a high current, the power supply device determines that it is possible to start power supply to the power receiving device at a high current.

According to one embodiment described above, it is possible to provide a power supply system that can start power supply at a high current without applying USB Power Delivery to the power supply system.

BRIEF DESCRIPTION OF THE DRAWINGS

FIG. 3 is a schematic diagram showing the pin arrangement of a first USB connector that conforms to the USB Type-C standard;

FIG. 4 is a schematic diagram showing the pin arrangement of a second USB connector that conforms to the USB Type-C standard;

FIG. 8 is a diagram showing the correspondence of VBUS pins and signal pins to downstream port numbers in the first USB connector of the power supply device;

FIG. 9 is a diagram showing the correspondence of signal pins (number notification pins) to downstream port numbers in the second USB connector of the power receiving device;

FIG. 17 is a flow chart showing the flow of processing in the power supply device.

DETAILED DESCRIPTION

Figure 1:
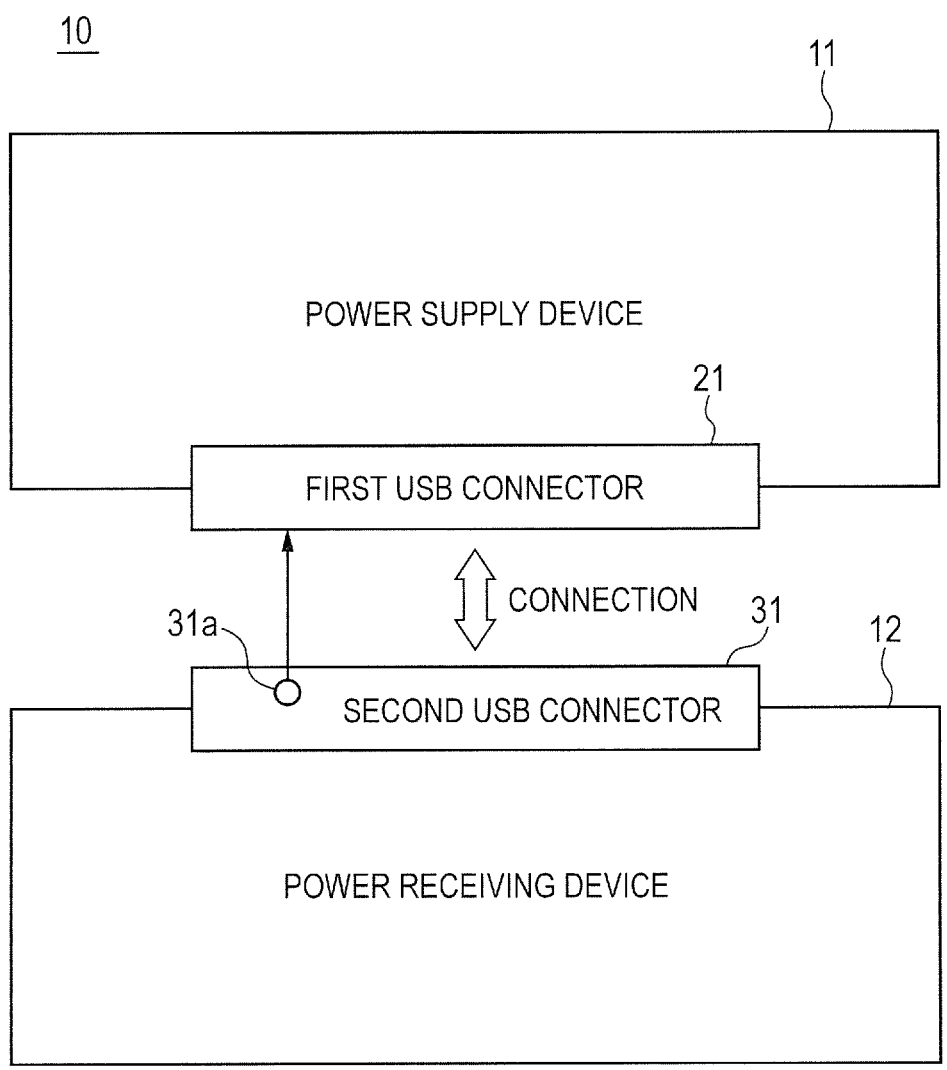
FIG. 1 is a block diagram showing an example of a configuration of a power supply system according to the outline of embodiments.

Hereinafter, embodiments using means for solving the above problems will be described in detail with reference to the accompanying drawings. The following descriptions and drawings are appropriately omitted and simplified to clarify the explanation. Further, elements shown in each figure as functional blocks for performing various processes can be configured with a CPU (Central Processing Unit), a memory, or other circuits in terms of hardware, and can be implemented by programs and the like loaded into the memory in terms of software. Thus, it will be understood to those skilled in the art that the functional blocks can be implemented in various forms only by hardware, only by software, or by a combination of them, and the implementation method is not limited to one of these forms. Note that the same elements are denoted by the same reference numerals throughout the drawings for describing the embodiments, and the repetitive description thereof may be omitted accordingly.

Further, the programs can be stored using various types of non-transitory computer readable media and supplied to a computer. The non-transitory computer readable media include various types of tangible storage media. The non-transitory computer readable media include magnetic recording media (for example, flexible disk, magnetic tape, and hard disk), magneto-optical recording media (for example, magneto-optical disk), CD-ROM (Read Only Memory), CD-R, CD-R/W, and semiconductor memories (for example, mask ROM, PROM (Programmable ROM), EPROM (Erasable PROM), flash ROM, and RAM (Random Access Memory)). Further, the programs can also be supplied to the computer by means of various types of transitory computer readable media. Examples of transitory computer readable media include electrical signals, optical signals, and electromagnetic waves. The transitory computer readable media can supply programs to computers through wired communication paths, such as electric wire and optical fiber, or through a wireless communication path.

The following embodiments will be explained by dividing them into a plurality of sections or embodiments, if necessary for convenience. However, they are not irrelevant to each other unless otherwise stated, and are involved in relationships in which one is a variation, detail, supplement of a part or whole of the others. Further, in the following embodiments, when referring to the number of elements (including the number of pieces, numerical value, amount, range, and the like), the number of elements is not limited to a specific number unless expressly stated otherwise and unless the number is clearly limited to a specific number in principle or other reasons. The number of elements can be greater or smaller than the specific number.

Further in the following embodiments, it goes without indicating that the components (including operation steps and the like) are not necessarily required, unless expressly stated otherwise and unless they are considered to be clearly required in principle or other reasons. Also, in the following embodiments, when referring to the shape, the positional relationship, or other characteristics of the components and the like, elements that substantially approximate or similar to the shape or other characteristics are included unless expressly stated otherwise and unless they are clearly considered not to be so in principle. This also applies to the value or the like (including the number of pieces, numerical value, amount, range, and the like).

Outline of Embodiments

Before giving a detailed description of embodiments, the outline of embodiments is first described. FIG. 1 is a block diagram showing an example of a configuration of a power supply system 10 according to the outline of embodiments. As shown in FIG. 1, the power supply system 10 includes a power supply device 11 and a power receiving device 12. The power supply device 11 has a first USB connector 21 that conforms to the USB Type-C standard. The power receiving device 12 has a second USB connector 31 that conforms to the USB Type-C standard. The second USB connector 31 has a high current notification pin 31a for notifying that the power receiving device 12 can receive power at a high current greater than a predetermined reference current. Here, the predetermined reference current means, for example, a current (1.5 A) that can be supplied in accordance with BC 1.2.

When the second USB connector 31 is coupled to the first USB connector 21, the power receiving device 12 notifies the power supply device 11 of the fact that it is possible to receive power at a high current greater than the predetermined reference current through the high current notification pin 31a. When receiving the notification from the power receiving device 12 indicating that it is possible to receive power at a high current, the power supply device 11 determines that it is possible to start power supply to the power receiving device 12 at a high current.

In this way, the power supply system 10 is configured such that the power receiving device 12 notifies the power supply device 11 of the fact that it is possible to receive power at a high current, through the high current notification pin 31a, allowing the power supply device 11 to start power supply to the power receiving device 12 at a high current greater than the predetermined reference current, without applying the USB Power Delivery (PD) to the power supply system 10.

First Embodiment

Figure 2:
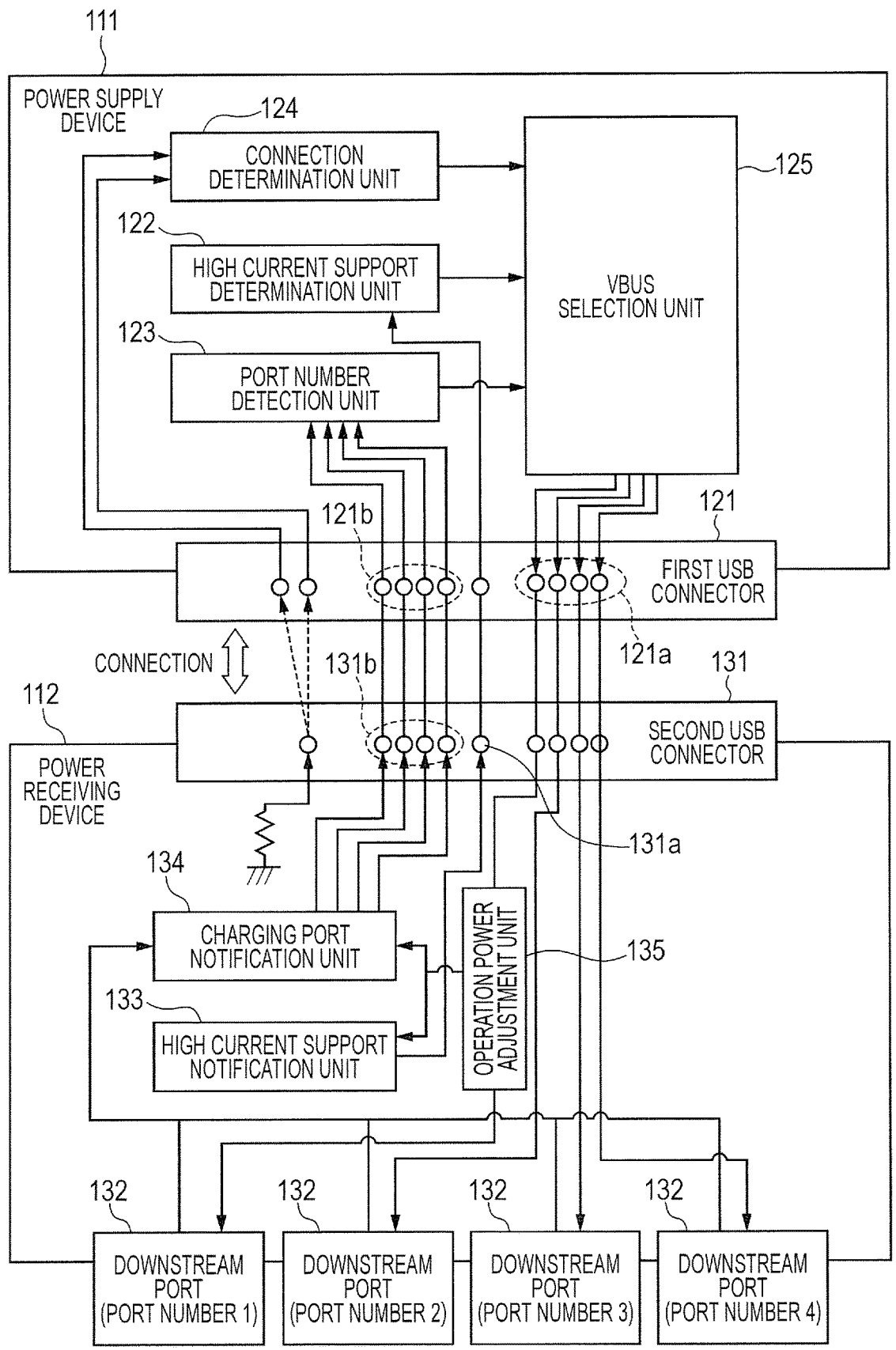
FIG. 2 is a block diagram showing a configuration example of a power supply system according to a first embodiment.

Next, details of an embodiment are described. FIG. 2 is a block diagram showing a configuration example of a power supply system 110 according to a first embodiment. As shown in FIG. 2, the power supply system 110 includes a power supply device 111 and a power receiving device 112. For example, the power supply device 111 is a power supply source dedicated to power supply. The power supply device 111 has a first USB connector 121 that conforms to the USB Type-C standard. For example, the power receiving device 112 is a bus-powered hub for charging. The power receiving device 112 includes a second USB connector 131 that conforms to the USB Type-C standard, as well as a plurality of downstream ports 132 (four downstream ports with port numbers 1 to 4 here).

The first USB connector 121 has a VBUS pin 121a for supplying power to the power receiving device 112. The second USB connector 131 includes a high current notification pin 131a for notifying the power receiving device 112 of the fact that it is possible to receive power at a high current greater than a predetermined reference current, and a number notification pin 131b for notifying the power receiving device 112 of the number of the downstream port that needs charging. The second USB connector 131 in the power receiving device 112 is coupled to the first USB connector 121 in the power supply device 111. The first USB connector 121 and the second USB connector 131 can be coupled through a connection cable or can be directly coupled to each other. For example, when the first USB connector 121 and the second USB connector 131 are directly coupled, the first USB connector 121 can be treated as a female receptor and the second USB connector 131 can be treated as a male plug.

FIG. 3 is a schematic diagram showing the pin arrangement of the first USB connector 121 that conforms to the USB Type-C standard. FIG. 4 is a schematic diagram showing the pin arrangement of the second USB connector 131 that conforms to the USB Type-C standard. As shown in FIGS. 3 and 4, each of the first USB connector 121 and the second USB connector 131 has 12 pins in the A row (pin numbers A1 to A12) and 12 pins in the B row (pin numbers B1 to B12), thus 24 pins in total. In the first USB connector 121 and the second USB connector 131, the pins are arranged in the A row and the B row in a rotationally symmetrical manner. For example, a D− pin, which is a USB data line for communicating information of USB 2.0, is placed in A7 and B7 located at positions rotationally symmetrical with each other. Further, D+ pin is placed in A7 and b7 at rotationally symmetrical positions.

As shown in FIG. 3, in the first USB connector 121, the A row includes GND pins (pine numbers A1, A12), a CC1 pin (pin number A5) for configuration signal, D± pins (pin numbers A6, A7) for transmission/reception signal of a first USB communication mode, TX1± (pin numbers A2, A3) for transmission signal of a second USB communication mode, and RX2± (pin numbers A10, A11) for reception signal of the second USB communication mode. The B row includes GND pins (pin numbers B1, B12), a CC2 pin (pin number B5) for configuration signal, D± pins (pin numbers B6, B7) for transmission/reception signal of the first USB communication mode, TX2± (pin numbers B2, B3) for transmission signal of the second USB communication mode, and RX1± (pin numbers B10, B11) for reception signal of the second USB communication mode. For example, the first USB communication mode is USB 2.0 mode, and the second USB communication mode is SuperSpeed USB mode.

As shown in FIGS. 3 and 4, the pin arrangement of the second USB connector 131 is the same as the pin arrangement of the first USB connector 121, except the pin numbers A5 and B5. In the first USB connector 121, the pin number A5 is assigned to the CC1 pin and the pin number B5 is assigned to the CC2. However, in the second USB connector 131, the pin number A5 is assigned to the CC pin and the pin number B5 is assigned to VCONN. The CC pin and the VCONN pin in the second USB connector 131 are coupled to the CC1 pin or the CC2 pin in the first USB connector 121. In the USB Type-C standard, the plug can be inserted to the receptacle in both front and back directions. For this reason, in the USB Type-C standard, the plug insertion direction is detected by using the CC pin.

In the USB Type-C standard, the plug insertion direction is determined by the CC pin when normal USB communication is performed, except in the alternate mode. As a result, one of the combinations of the TX1± pins, the TX2± pins, the RX1± pins, and the RX2± pins, for example, a pair of TX1± pin and RX1± pin is used in USB communication, but the other combination, for example, a pair of TX2± pin and RX2± pin is not used. In the power supply system 110, for example, a SBU1 pin and a SBU2 pin are used as the high current notification pin 131a. Further, of the TX1± pins, the TX2± pins, the RX1± pins, and the RX2±pins, for example, at least one pair is used as the number notification pin 131b. In FIG. 4, the TX2+ pin, the TX2− pin, the RX2+ pin, and the RX2− pin are used as the number notification pin 131b. The roles of the high current notification pin 131a and the number notification pin 131b will be described later.

The first USB connector 121 in the power supply device 111 and the second USB connector 131 in the power receiving device 112 respectively have four VBUS pins. As described later, in the power supply system 110, a plurality of downstream ports 132 (see FIG. 2) in the power receiving device 112 respectively correspond to the VBUS pins of the second USB connector 131, in which power is transmitted to each downstream port 132 through the corresponding VBUS pin. Thus, when the first USB connector 121 and the second USB connector 131 are coupled through the connection cable that conforms to the USB Type-C standard, the number of power supply lines VBUS required in the connection cable is at least the same as the number of downstream ports.

Figure 5:
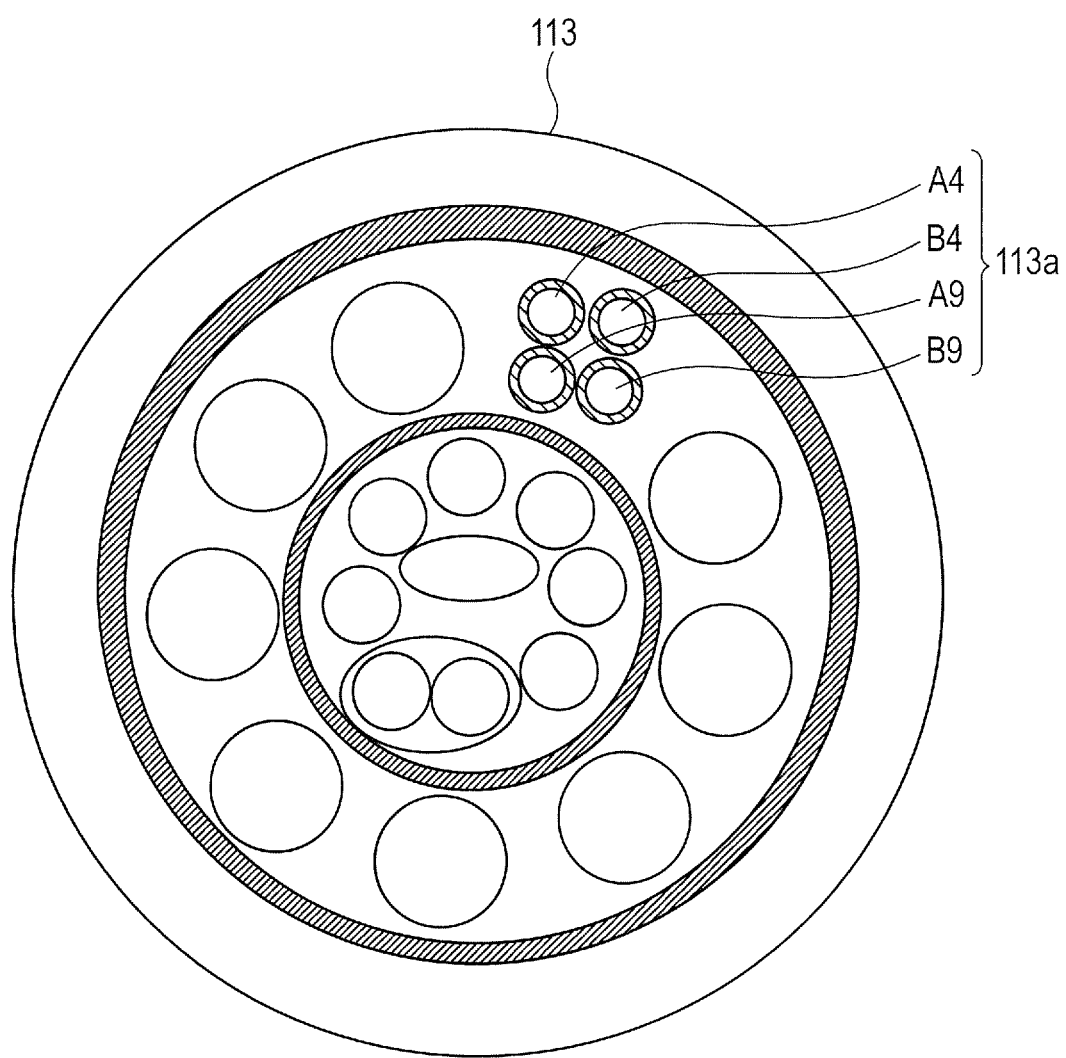
FIG. 5 is a schematic diagram showing an example of a cross section of a connection cable for coupling the first USB connector and the second USB connector.

FIG. 5 is a schematic diagram showing an example of a cross section of the connection cable 113 that couples the first USB connector 121 and the second USB connector 131. As shown in FIG. 5, the connection cable 113 includes a plurality of power supply lines VBUS 113a corresponding to each of the downstream ports in the power receiving device 112. In other words, the power supply line VBUS 113a is divided into four equal parts so as to correspond to four downstream ports 132 (see FIG. 2). Each of the power supply lines VBUS is insulated and coated with shield. By configuring the connection cable 113 as described above, it is possible to appropriately transmit power from the power supply device 111 to each of the four downstream ports 132 in the power receiving device 112.

Figure 6:
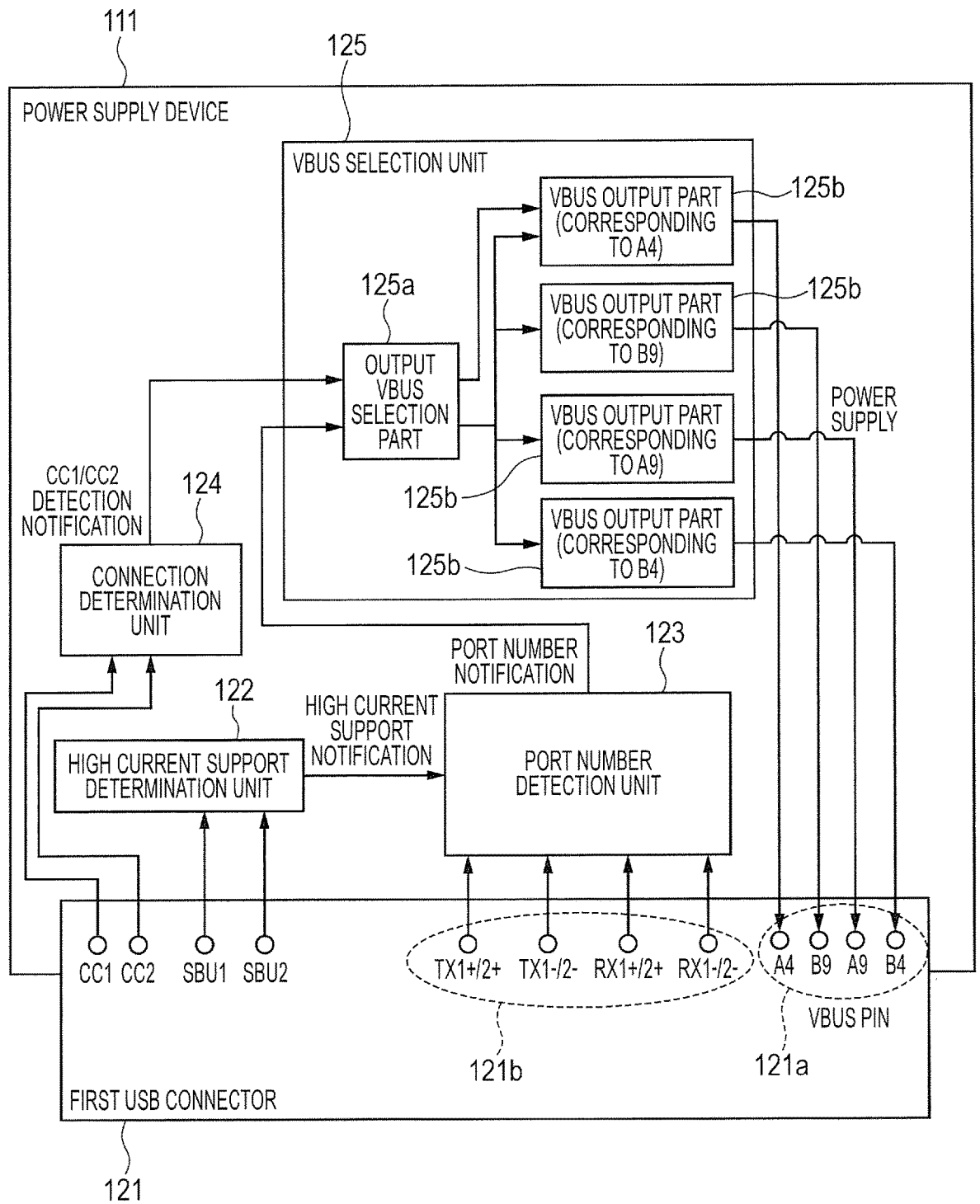
FIG. 6 is a block diagram showing a detailed configuration of a power supply device.

FIG. 6 is a block diagram showing a detailed configuration of the power supply device 111. As shown in FIG. 6, the power supply device 111 includes a high current support determination unit 122, a port number detection unit 123, a connection determination unit 124, and a VBUS selection unit 125. First, a case in which the SBU1 pin and the SUB2 pin are active is described below. The high current support determination unit 122 detects that the SBU1 pin and the SUB2 pin are active (High). When detecting that the SUB1 pin and the SUB2 pin are active (High), the high current support determination unit 122 determines that the power receiving device coupled to the first USB connector 121 is the power receiving device 112 that supports high current. Then, the high current support determination unit 122 notifies the power number detection unit 123 of the determination result. In other words, when the SBU1 pin and the SBU2 pin are active (High), the high current support determination unit 122 determines that the coupled power receiving device can receive power through a plurality of VBUS pins.

When receiving the notification from the high current support determination unit 122 indicating that the coupled power receiving device supports high current, the port number detection unit 123 detects a pin that is active (high), of the TX2+, TX2−, RX2+, RX2− pins (number notification receiving pins 121b) on the male connector of the coupled power receiving device. When detecting that at least one pin is active (High) of the TX2+, TX2−, RX2+, and RX2− pins (number notification receiving pins 121b) on the male connector of the coupled power receiving device, the power number detection unit 123 notifies the VBUS selection unit 125 of the port number of the downstream port 132 (see FIG. 2) corresponding to the active pin. The connection determination unit 124 determines whether or not resistance is detected in the CC1 pin or the CC2 pin in the first USB connector 121. Then, the connection determination unit 124 notifies the VBUS selection unit 125 of the determination result.

The VBUS selection unit 125 includes an output VBUS selection part 125a as a voltage output selection part, and a VBUS output part 125b as a voltage output part. The output VBUS selection part 125a transmits an output instruction to the VBUS output part 125b, for example, corresponding to the VBUS pin with the pin number A4, based on the port number notification obtained through the signal pin that is determined not to be used for USB communication based on the notification from the connection determination unit 124 indicating that resistance has been detected in the CC1 pin or the CC2 pin. The VBUS output part 125b corresponding to the VBUS pin with the pin number A4, which receives the output instruction from the output VBUS selection part 125a, outputs power that is specified in BC1.2.

When the port number of the downstream port 132 (see FIG. 2) is notified from the port number detection unit 123, the output VBUS selection part 125a transmits an output instruction to the VBUS output part 125b corresponding to the notified port number. The VBUS output part 125b is a power supply controller, which is provided corresponding to each of the VBUS pins (pin numbers A4, B9, A9, and B4). Upon receiving the output instruction from the output VBUS selection part 125a, each of the VBUS output parts 125b outputs power at a predetermined reference current.

When the SBU1 pin and the SBU2 pin are not active, the high current support determination unit 122 determines that the power receiving device coupled to the first USB connector 121 is not the power receiving device that can receive power through a plurality of VBUS pins. In this case, the VBUS output part 125b is controlled so that the power supply device outputs power through one of the VBUS pins.

Figure 7:
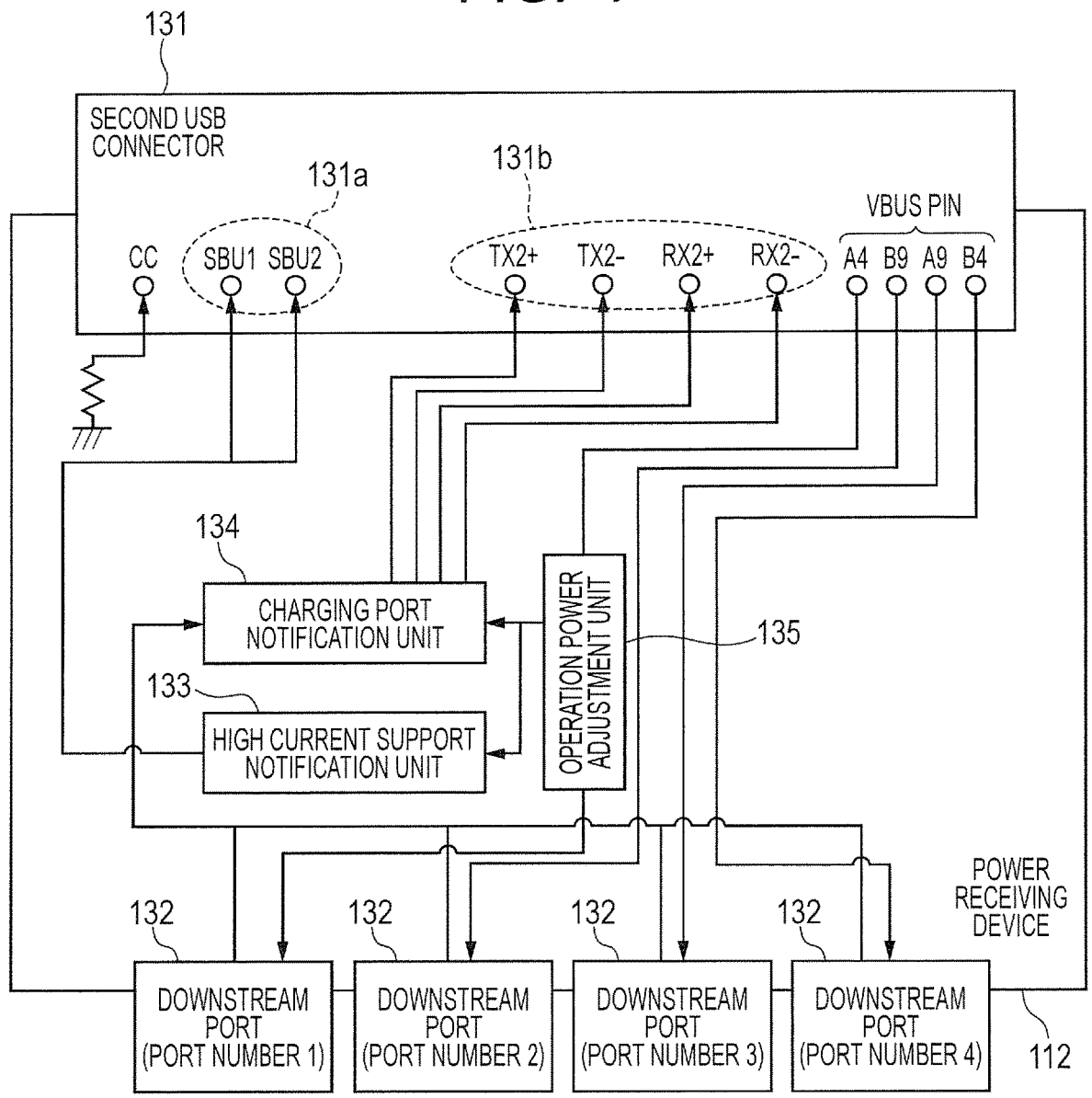
FIG. 7 is a block diagram showing a detailed configuration of a power receiving device.

FIG. 7 is a block diagram showing a detailed configuration of the power receiving device 112. As shown in FIG. 7, the power receiving device 112 includes a high current support notification unit 133, a charging port notification unit 134, and an operation power adjustment unit 135. The high current support notification unit 133 activates the SBU1 pin and the SBU2 pin when an operation power is supplied from the power supply device 111 (see FIG. 6) through a VBUS pin (here, VBUS pin with the pin number A4). Here, the operation power is, for example, the power that allows the charging port notification unit 124 and the high current support notification unit 133 to operate in the power receiving device 112. Note that it is assumed that the voltage level when the SBU1 pin and the SBU2 pin are High is a value other than that defined in the USB standard or the USB Type-C standard.

The number notification pins 131b (TX2+, TX2−, RX2+, RX2−) are provided so as to correspond to each of the downstream ports 132. Of the number notification pins (TX2+, TX2−, RX2+, RX2−), the charging port notification unit 125 makes a pin active (High) that corresponds to the number of the downstream port 132 of a device that needs charging of the devices coupled to the downstream ports 132. The downstream ports 132 correspond to each of the VBUS pins, and thus power is supplied to each downstream port 132 from the corresponding VBUS pin. When the power is supplied from the power supply device 111 through the VBUS pin (pin number A4) in the second USB connector 131, the operation power adjustment unit 135 prioritizes power supply to the downstream port 132 by adjusting the current value to the minimum value at which the power receiving device 112 can operate.

As shown in FIG. 7, a resistance is coupled to the CC pin of the second USB connector 131. When the CC pin of the second USB connector 131 is coupled to the CC1 pin of the first US connector 121 in the power supply device 111 shown in FIG. 6, the resistance in the CC1 pin of the first USB connector 121 is detected by the connection determination unit 124 of the power supply device 111. On the other hand, when the CC pin of the second USB connector 131 is coupled to the CC2 pin of the first USB connector 121 in the power supply device 111, the resistance in the CC2 pin of the first USB connector 121 is detected by the connection determination unit 124 of the power supply device 111.

FIG. 8 is a diagram showing the correspondence of the VBUS pin and signal pin to the port number of the downstream port 132 (see FIG. 7) in the first USB connector 121 of the power supply device 111. As shown in FIG. 8, the correspondence of the VBUS pin to the port number is as follows: the pin number A4 corresponds to the port number 1, the pin number B9 corresponds to the port number 2, the pin number A9 corresponds to the port number 3, and the pin number B4 corresponds to the port number 4. A signal pin that is not selected for UB communication after determination of the flag insertion direction is allocated to the number notification pin. Thus, the signal pin for the notification of the port number of the downstream port 132 varies between when the resistance is detected in the CC1 pin and when the resistance is detected in the CC2 pin. In other words, when the resistance is detected in the CC1 pin, the correspondence of signal pins to port numbers is as follows: the TX2+ pin corresponds to the port number 1, the TX2− pin corresponds to the port number 2, the RX+ pin corresponds to the port number 3, and the RX2− corresponds to the port number 4. When the resistance is detected in the CC2 pin, the correspondence of signal pins to port numbers is as follows: the TX1+ pin corresponds to the port number 1, the TX1− pin corresponds to the port number 2, the RX1+ pin corresponds to the port number 3, and the RX1− corresponds to the port number 4.

FIG. 9 is a diagram showing the correspondence between the signal pin (number notification pin 131b) and the port number of the downstream port 132 in the second USB connector 131 of the power receiving device 112. As shown in FIG. 9, the correspondence of the number notification pin 131b to the port number is as follows: the TX2+ pin corresponds to the port number 1, the TX2− pin corresponds to the port number 2, the RX2+ pin corresponds to the port number 3, and the RX2− pin corresponds to the port number 4.

Next, processing in the power supply device 111 and the power receiving device 112 is described below. Note that the following descriptions appropriately refer to FIG. 2 for the configuration of the power supply system 110, FIG. 6 for the configuration of the power supply device 111, and FIG. 7 for the configuration of the power receiving device 112.

Figure 10:
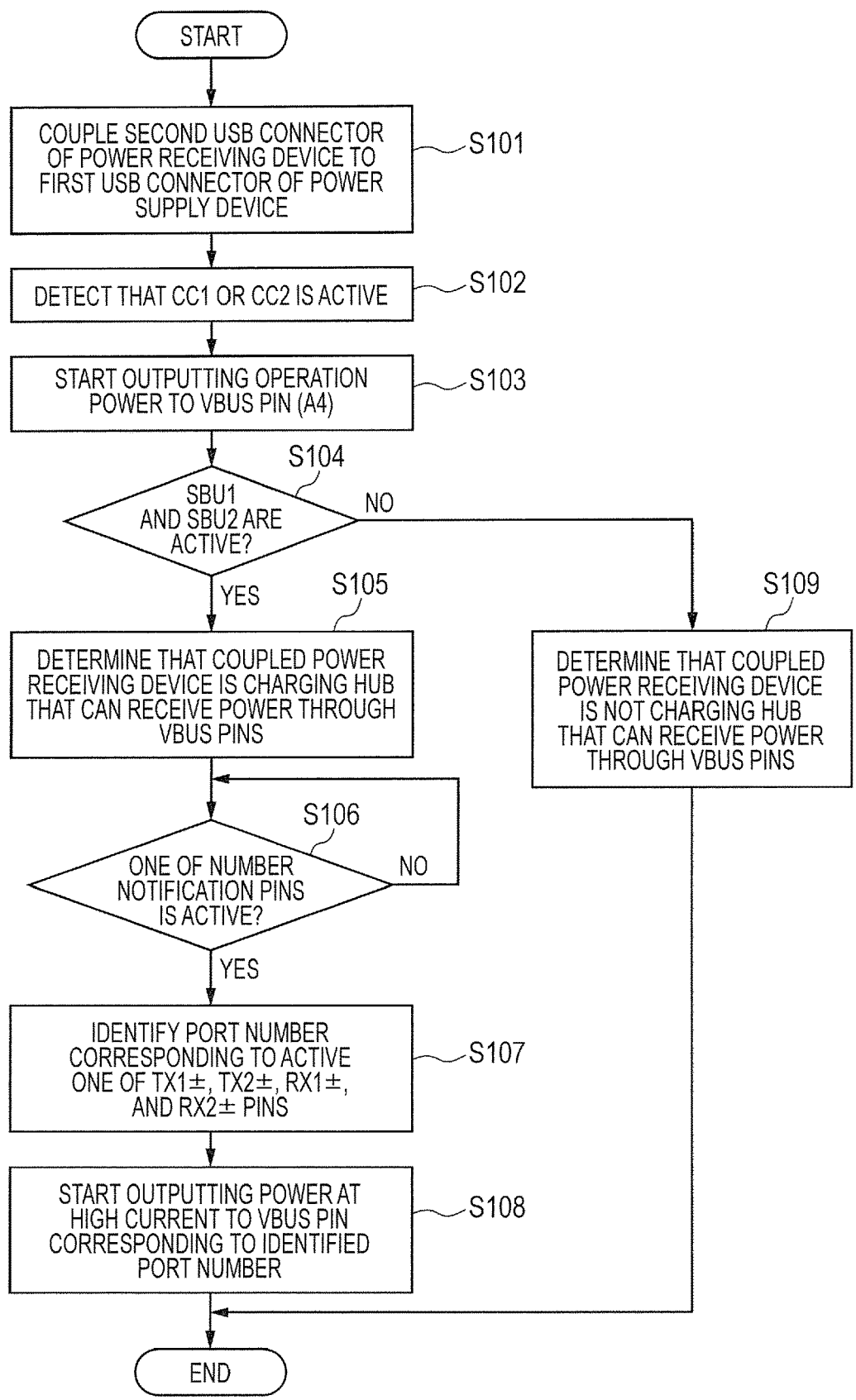
FIG. 10 is a flow chart showing the flow of processing in the power supply device.

FIG. 10 is a flow chart showing the flow of processing in the power supply device 111. As shown in FIG. 10, first the second USB connector of the power receiving device 112 is coupled to the first USB connector 121 of the power supply device 111 (Step S101). Then, the connection determination unit 124 detects that CC1 or CC2 is active (Step S102).

Following Step S102, the VBUS selection unit 125 starts outputting the operation power to the VBUS pin (A4) (Step S103). Next, the high current support determination unit 122 determines whether or not the SBU1 pin and the SBU2 pin are active (Step S104).

In Step S104, if the SBU1 pin and the SBU2 pin are active (if YES), the high current support determination unit 122 determines that the power receiving device coupled to the first USB connector 121 is the charging hub (power receiving device 112) that can receive power though a plurality of VBUS pins (Step S105). In step S104, if the SBU1 pin and the SBU2 pin are not active (if NO), the high current support determination unit 122 determines that the power receiving device coupled to the first USB connector 121 is not the charging hub that can receive power through a plurality of VBUS pins (Step S109). Then, the power supply device 111 continues the power output state in Step S103 and ends the process for the charging hub.

Following Step S105, the port number detection unit 123 determines whether or not any of the number notification pins of TX1± and RX1± or of TX2± and RX2±, are active (Step S106). In Step S106, if one of the number notification pins is active (if YES), the port number detection unit 123 identifies the port number of the downstream port 132 corresponding to the active pin of the number notification pins (Step S107). The port number identified by the port number detection unit 123 is notified to the VBUS selection unit 125. Following Step S107, the VBUS selection unit 125 starts outputting power to the VBUS pin corresponding to the identified port number (Step S108) Then, the power supply device 111 ends the process.

Figure 11:
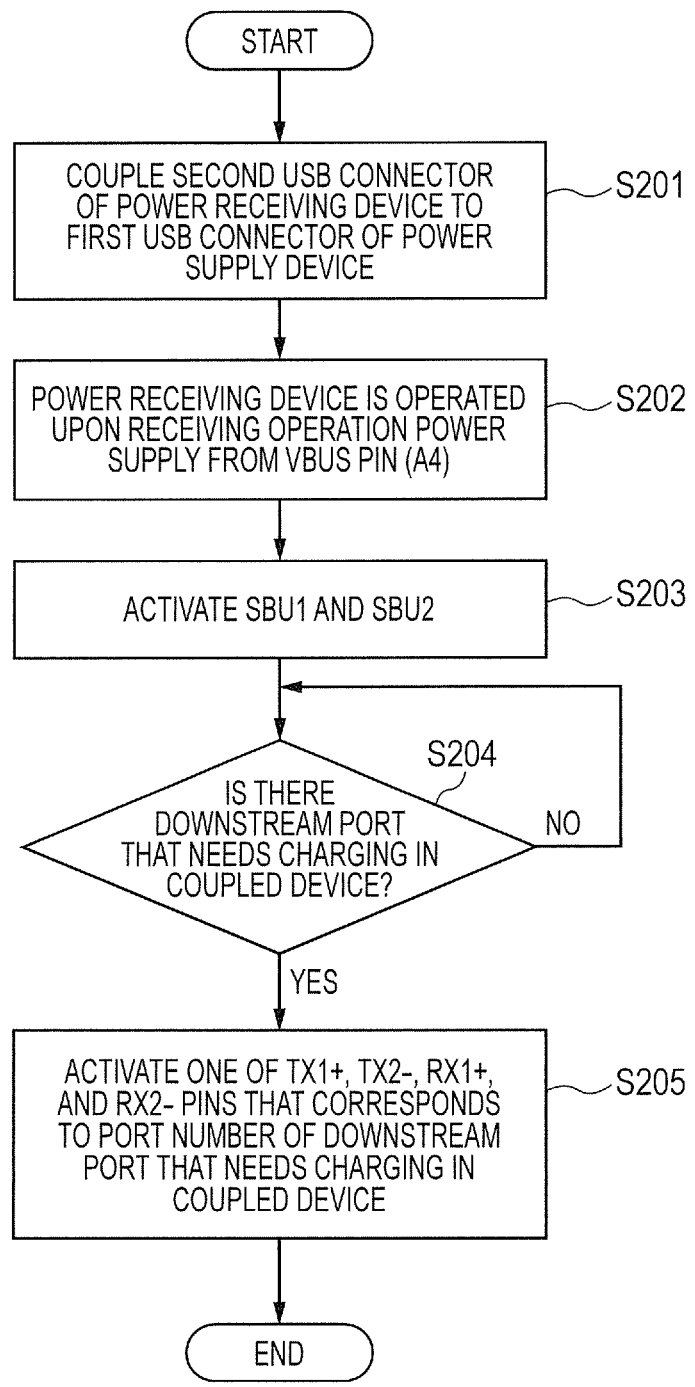
FIG. 11 is a flow chart showing the flow of processing in the power receiving device.

FIG. 11 is a flow chart showing the flow of processing in the power receiving device 112. As shown in FIG. 11, first the second USB connector 131 of the power receiving device 112 is coupled to the first USB connector 121 of the power supply device 111 (Step S201). Then, the power receiving device 112 is operated with the operation power supplied through the VBUS pin (A4) (Step S202). Next, the high current support notification unit 133 activates the SBU1 pin and the SBU2 pin that serve as the high current notification pin 131a (Step S203).

Following Step S203, the charging port notification unit 134 determines whether or not there is a downstream port that needs charging in the coupled device, of the downstream ports (Step S204). In Step S204, if there is a downstream port that needs charging in the coupled device (if YES), the high current support notification unit 133 activates the pin corresponding to the port number of the downstream port 132 that needs charging in the coupled device, of TX2+, TX2−, RX2+, and RX2− that serve as the number notification pins 131b (Step S205).

Figure 12:
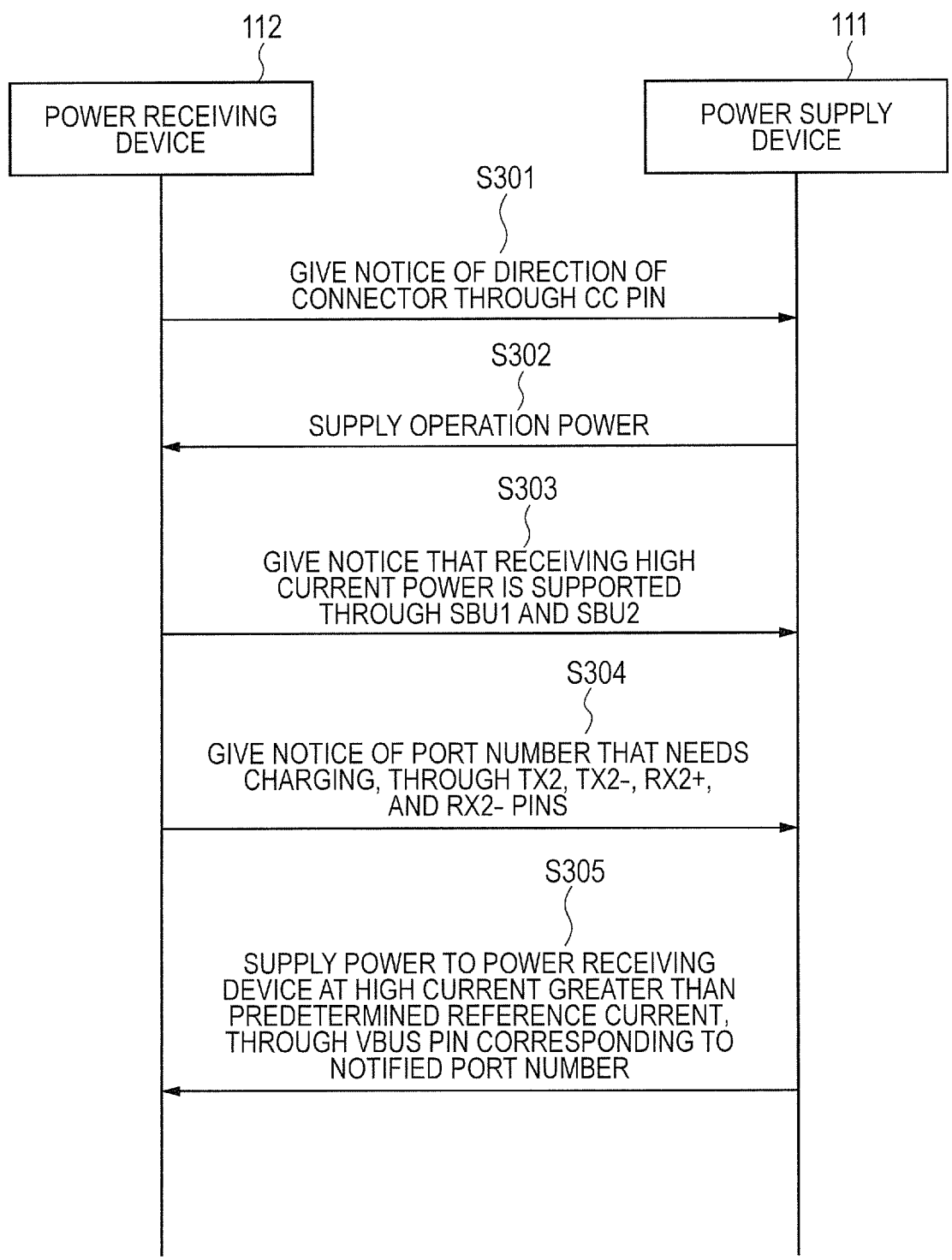
FIG. 12 is a sequence diagram showing exchange of signals between the power receiving device and the power supply device in the power supply system.

FIG. 12 is a sequence diagram showing exchange of signals between the power receiving device 112 and the power supply device 111 in the power supply system 110. As shown in FIG. 12, first the power receiving device 112 notifies the power supply device 111 of the direction of the connector through the CC pin (Step S301). Next, the power supply device 111 supplies the operation power to the power receiving device 112 (Step S302). Next, the power receiving device 112 notifies the power supply device 111 of the fact that the power receiving device 112 supports receiving high current power through SUB1 and SUB2 that serve as the high current notification pin 131a (Step S303) Next, the power receiving device 112 notifies the power supply device 111 of the port number of the downstream port that needs charging in the coupled device, through TX2+, TX2−, RX2+, and RX2− that serve as the number notification pin 131b (Step S304). Next, the power supply device 111 supplies power to the power receiving device 112 at a high current greater than a predetermined reference current (Step S305).

As described above, in the power supply system 110, since the power receiving device 112 notifies the power supply device 111 of the fact that it is possible to receive power at a high current through the high current notification pin 131a (the SBU1 pin and the SBU2 pin), the power supply device 111 can start power supply to the power receiving device 112 at a high current greater than the predetermined reference current, without applying PD to the power supply system 110.

In PD, in order to start power supply at a high current greater than the predetermined reference current, the process flow should be performed with SOP (Start Of Packet) communication and Message communication. In order to perform the process flow with SOP communication and Message communication, it is necessary to implement a controller (PD controller) having a function for controlling power supply or power receiving in accordance with PD into the power supply device and the power receiving device. At the same time, it is also necessary to have firmware to operate the PD controller. In the power supply system 110, PD is not applied and so there is no need to implement the PD controller and firmware to operate the PD controller.

In the power supply system 110, the power supply can be started at a high current greater than the predetermined reference current from the VBUS pin only after the SBU1 pin and the SBU2 pin are detected to be active. Thus, it is possible to reduce the risk of accidentally supplying power at a high current greater than the predetermined reference current in the case of connection of a power receiving device that does not support power reception at a high current.

Further, in the power supply system 110, the port number of the downstream port that needs charging in the coupled device is notified from the power receiving device 112 to the power supply device 111 through the number notification pin 131b. The power supply device 111 has the VBUS output part 125b corresponding to each downstream port. When being notified of the port number of the downstream port 132 that needs charging in the coupled device, the power supply device 111 supplies power to the downstream port 132 of the notified port number through VBUS corresponding to the notified port number. On the other hand, when PD is not applied to the power supply system, in general, the power receiving device must distribute the power supplied from the power supply device through one VBUS pin, for example, to four downstream ports. At this time, the power transmitted through one VBUS pin is the power specified in BC1.2. This power is distributed to a plurality of downstream ports. However, in the power supply system 110 according to the present embodiment, the power is supplied to the power receiving device from the power supply device through a plurality of VBUS pins, in such a way that the power is transmitted from the VBUS pins corresponding to each of the downstream ports. The power supplied through each VBUS pin is the power specified in BC1.2. In this case, a higher power can be supplied to each downstream port than the case of distributing one VBUS pin to a plurality of downstream ports.

Second Embodiment

Figure 13:
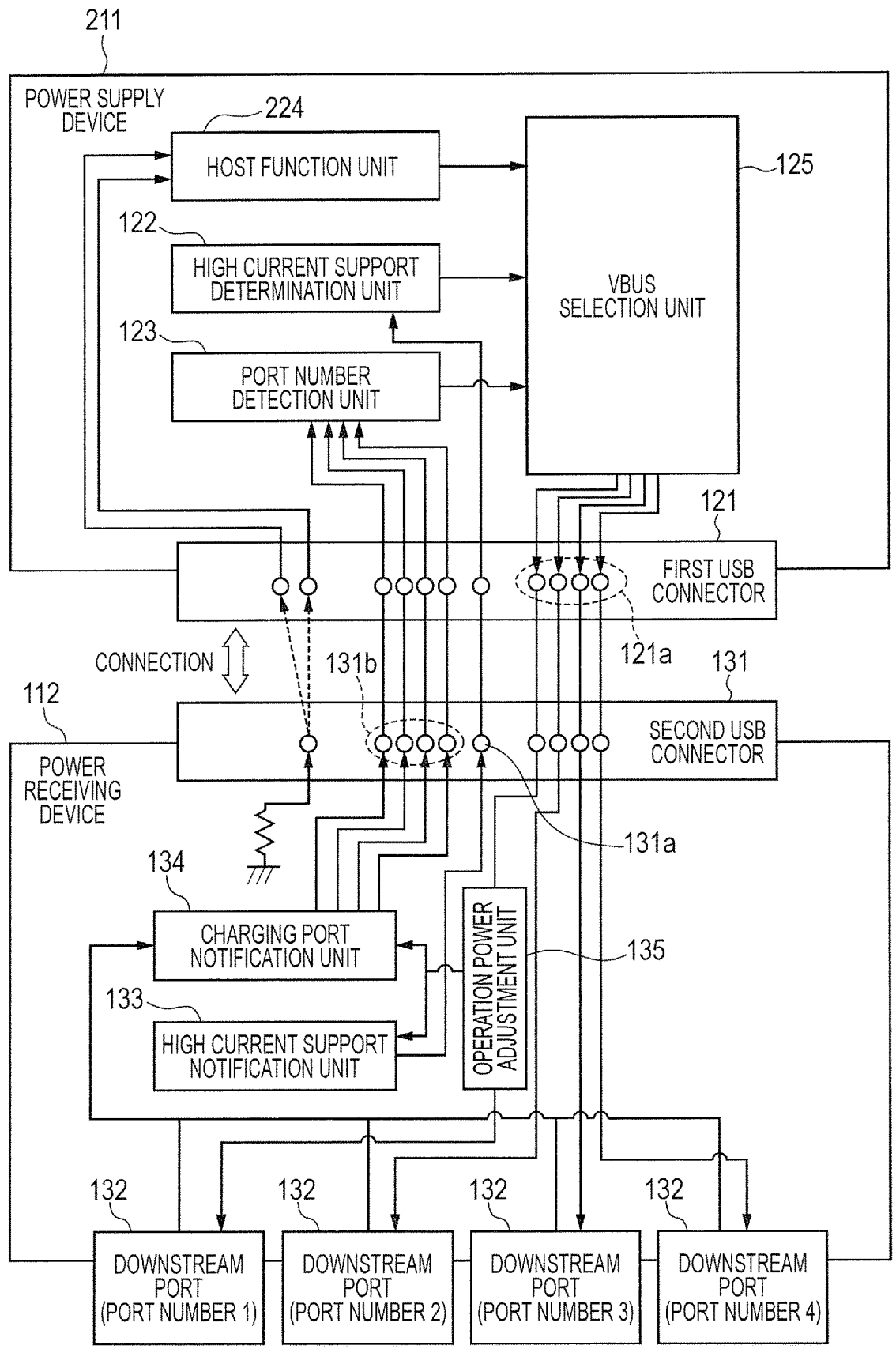
FIG. 13 is a block diagram showing a configuration of a power supply system according to a second embodiment.

The configuration of a power supply system 210 according to a second embodiment will be described with reference to FIG. 13. Hereinafter, the description of the same configuration as the first embodiment will be omitted and points different from the first embodiment will be described. FIG. 13 is a block diagram showing the configuration of the power supply system 210 according to the second embodiment. As shown in FIG. 13, the power supply system 210 includes a power supply device 211 and a power receiving device 212. The power supply system 210 is different only in the configuration of the power supply device 211 as compared to the power supply system 110 in the first embodiment shown in FIG. 2.

Figure 14:
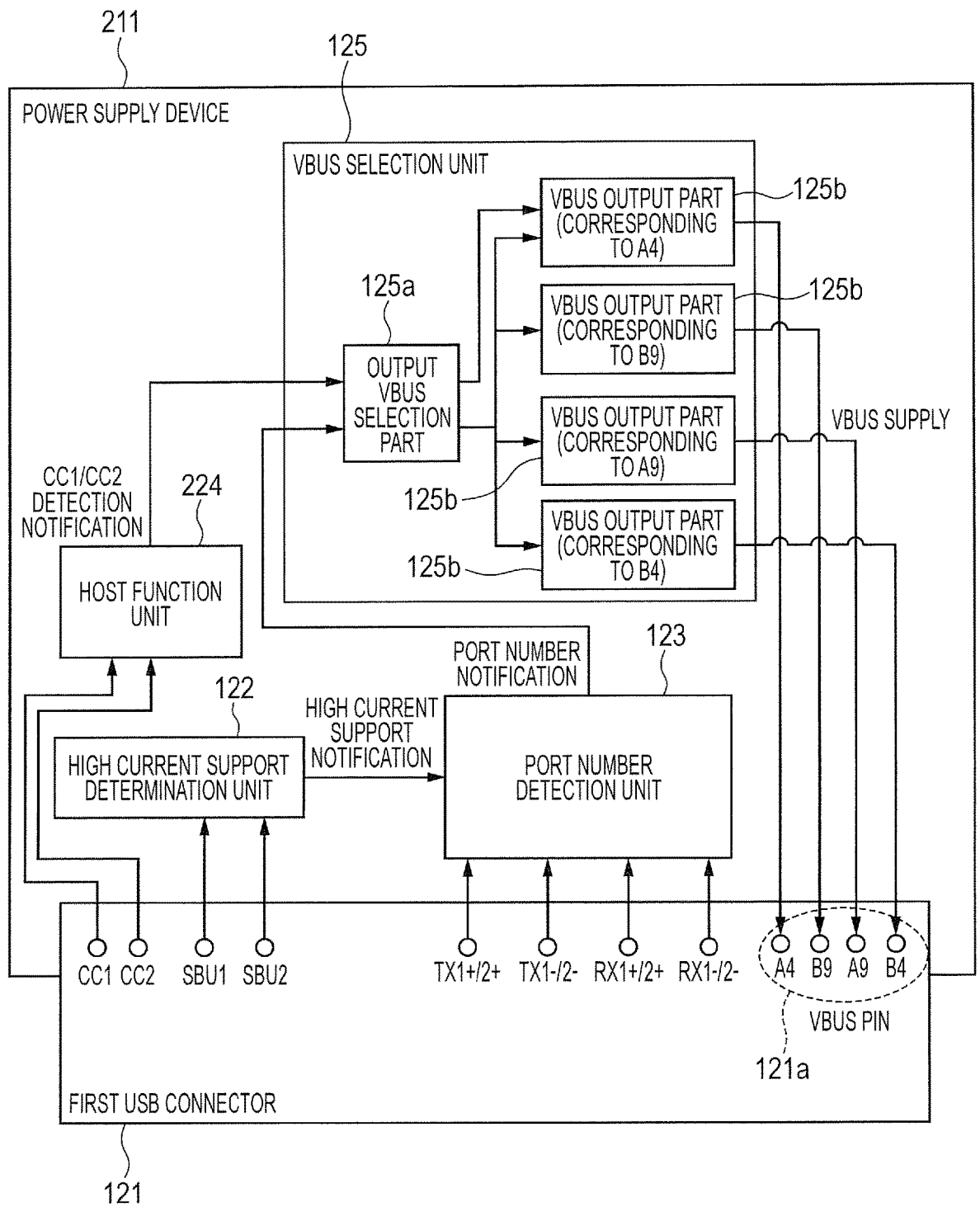
FIG. 14 is a block diagram showing a detailed configuration of a power supply device in the power supply system according to the second embodiment.

FIG. 14 is a block diagram showing the detailed configuration of the power supply device 211. As shown in FIG. 14, the power supply device 211 includes a high current support determination unit 122, a port number detection unit 123, a host function unit 224, and a VBUS selection unit 125. In other words, the power supply device 211 has the host function unit 224 instead of the connection determination unit 124 of the power supply device 111 (see FIG. 6) in the first embodiment. The host function unit 224, which controls USB data communication, is coupled to a signal pin, not shown, for USB communication. Further, the host function unit 224 has a determination function to determine front and back of the plug through the configuration pins (CC1 and CC2). The host function unit 224 selects one of two pairs of USB communication signal pins based on the determination result, and performs data communication control through the selected signal pins.

The power supply device 211 is configured such that the high current support determination unit 122, the port number detection unit 123, and the VBUS selection unit 125 are further implemented in an existing host device that already has the first USB connector 121 conforming to the USB Type-C standard as well as the host function unit 224. In other words, the configuration in the power supply device 211 is the same as the power device 111 in the first embodiment, except that the power supply device 211 has the host function unit 224, instead of the connection determination unit 124, to implement the function to start power supply to the power receiving device 112 at a high current greater than a predetermined reference current. Here, the existing host device is, for example, a personal computer, a display, a printer composite machine, an automotive navigation system, and the like.

The flow of processing in the power receiving device 112 of the power supply system 210 is the same as the flow of processing in the power receiving device 112 of the power supply system 110 described in the first embodiment with reference to FIG. 11 (so the power supply device 111 should be replaced with the power supply device 211 in description of FIG. 11). The exchange of signals between the power receiving device 112 and the power supply device 211 in the power supply system 210 is the same as the exchange of signals between the power receiving device 112 and the power supply device 111 that has been described in the first embodiment with reference to FIG. 12 (so the power device 111 should be replaced with the power supply device 211 in description of FIG. 12). The flow of processing in the power supply device 211 of the power supply system 210 is basically the same as the flow of processing in the power supply device 111 of the power supply system 110 that has been described in the first embodiment with reference to FIG. 10. In the process flow of the power supply device 211, the power supply device 111 should be replaced with the power supply device 211 in the process flow of the power supply device 111 described with reference to FIG. 10. Further, it is assumed that in Step S102, the power supply device 211 detects that CC1 or CC2 is active by using the determination function of the host function part 224 instead of using the connection determination unit 124.

As described above, in the power supply system 210, the power receiving device 112 notifies the power supply device 211 of the fact that it is possible to receive power at a high current through the high current notification pin 131a (SBU1 pin and SBU2 pin). Thus, the power supply device 211 can start power supply to the power receiving device 112 at a high current greater than a predetermined reference current, without applying PD to the power supply system. Further, in the existing host device that already has the first USB connector 121 conforming to the USB Type-C standard as well as the host function unit 224, by adding and implementing the high current support determination unit 122, the port number detection unit 123, and the VBUS selection unit 125, it is possible to add a function with which the power supply device 211 can start power supply to the power receiving device 112 at a high current greater than the predetermined reference current without applying PD to the power supply system.

Third Embodiment

Figure 15:
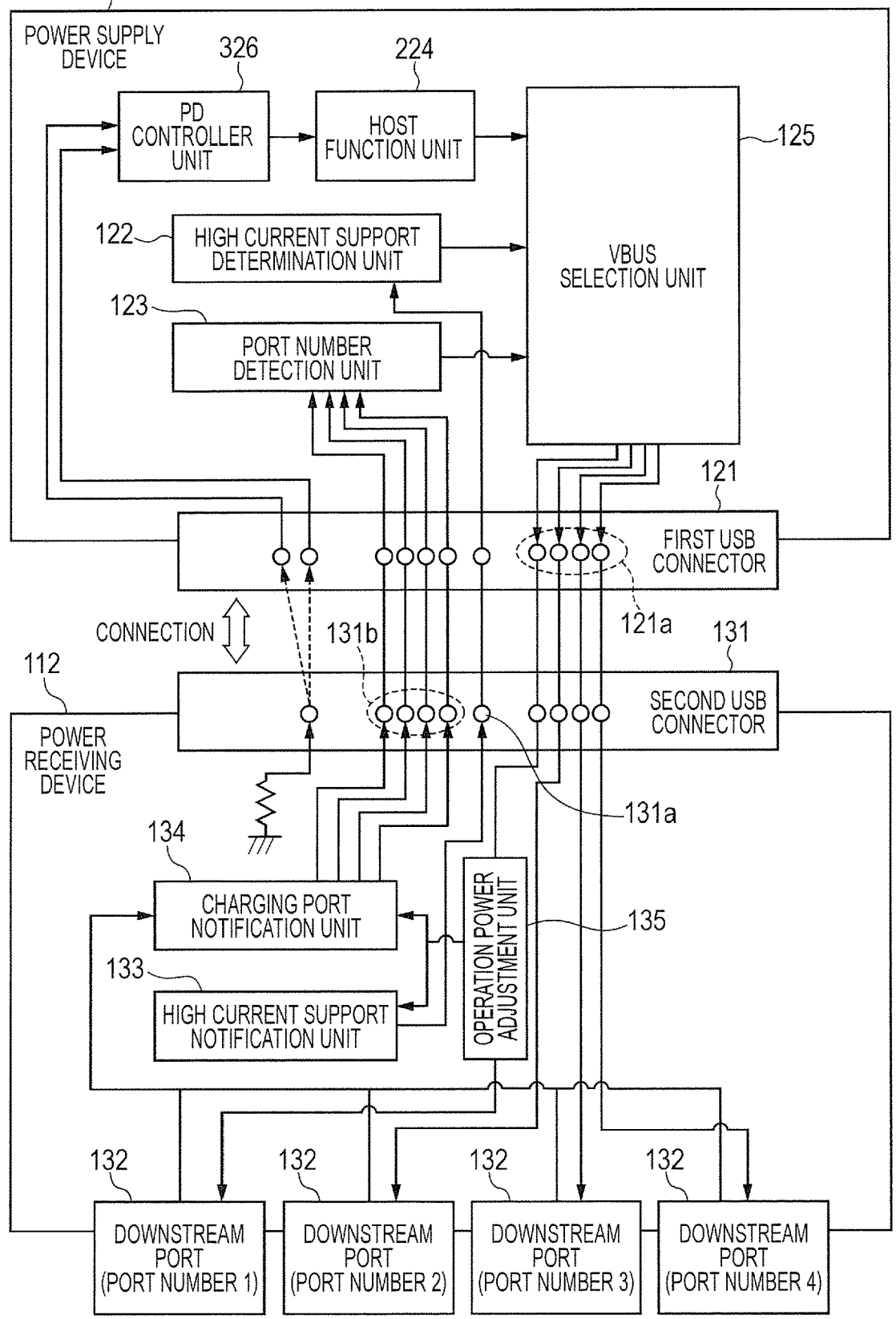
FIG. 15 is a block diagram showing a configuration of a power supply system according to a third embodiment.

The configuration of a power supply system 310 according to a third embodiment will be described. Hereinafter, the description of the same configuration as the first or second embodiment will be omitted and points different from the first or second embodiment will be described. FIG. 15 is a block diagram showing the configuration of the power supply system 310 according to the third embodiment. As shown in FIG. 15, the power supply system 310 includes a power supply device 311 and a power receiving device 112. The power supply system 310 is different only in the configuration of the power supply device 311 as compared to the power supply system 210 in the second embodiment shown in FIG. 13.

Figure 16:
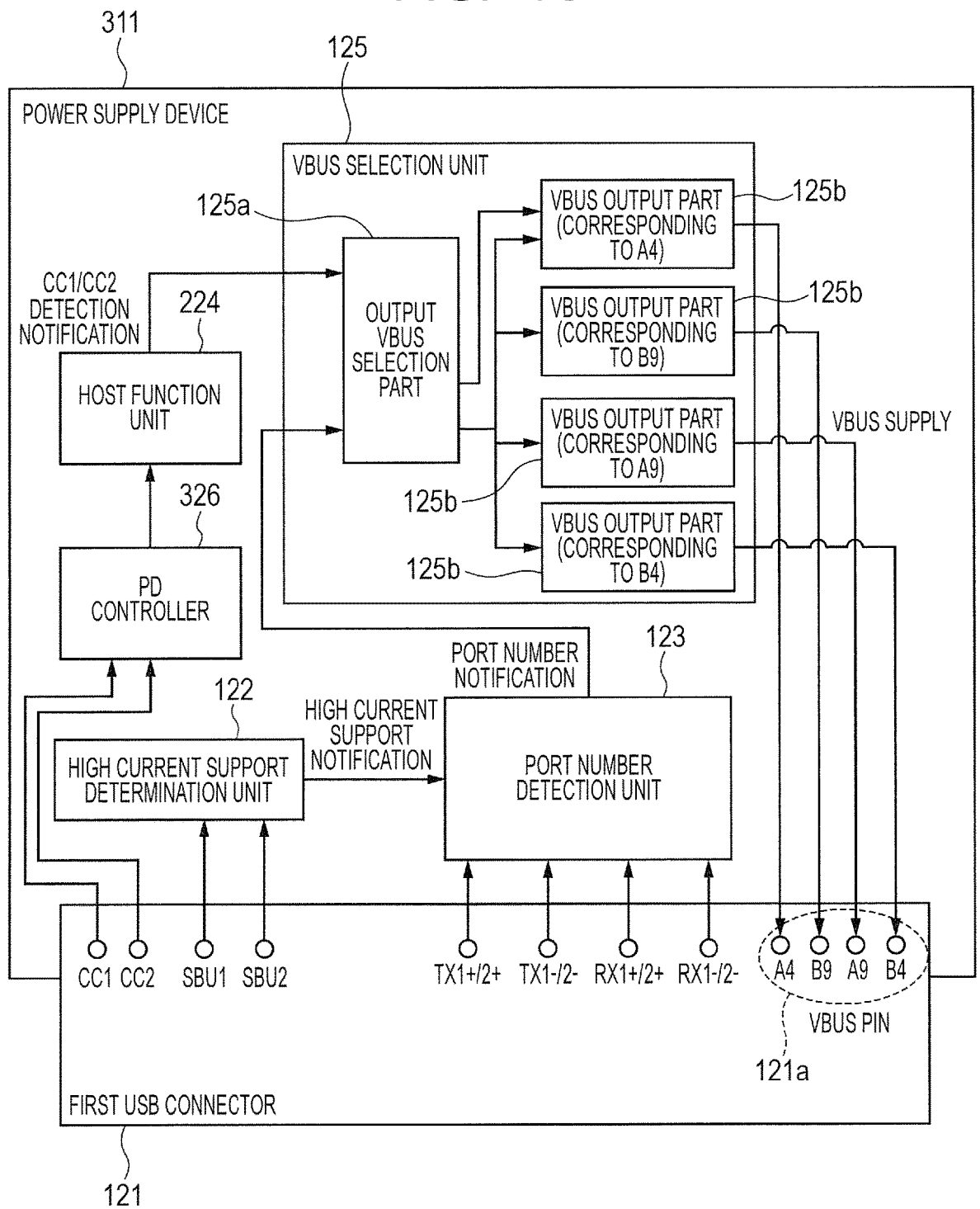
FIG. 16 is a block diagram showing a detailed configuration of a power supply device in the power supply system according to the third embodiment.

FIG. 16 is a block diagram showing the detailed configuration of the power supply device 311. As shown in FIG. 16, the power supply device 211 includes a high current support determination unit 122, a port number detection unit 123, a host function unit 224, a VBUS selection unit 125, and a PD controller 326. In other words, the power supply device 311 is configured such that the PD controller 326 having a function to control power supply or power receiving in accordance with PD, is further added to the power supply device 211 (see FIG. 14) in the second embodiment. The PD controller 326 has a determination function to determine whether the plug is inserted in the front or back direction based on the configuration pins (CC1 and CC2). The PD controller 326 negotiates for power control by using the configuration pin (CC1 or CC2) based on the determination result.

The flow of processing in the power receiving device 112 of the power supply system 310 is the same as the flow of processing in the power receiving device 112 of the power supply system 110 that has been described in the first embodiment with reference to FIG. 11 (so the power supply device 111 should be replaced with the power supply device 311 in description of FIG. 11). The exchange of signals between the power receiving device 112 and the power supply device 311 in the power supply system 310 is the same as the exchange of signals between the power receiving device 112 and the power supply device 111 that has been described in the first embodiment with reference to FIG. 12 (so the power supply device 111 should be replaced with the power supply device 311 in description of FIG. 12).

FIG. 17 is a flow chart showing the flow of processing in the power supply device 311. As shown in FIG. 17, first the second USB connector of the power receiving device 112 is coupled to the first USB connector of the power supply device 311 (Step S401). Then, the PD controller 326 detects that CC1 or CC2 is active by using the determination function of the PD controller 326 (Step S402).

Following Step S402, the VBUS selection unit 125 starts outputting the operation power to the VBUS pin (A4) (Step S403). Next, the high current support determination unit 122 determines whether or not the SBU1 pin and the SBU2 pin are active (Step S404).

In Step S404, if the SBU1 pin and the SBU2 pin are active (if YES), the power supply device determines that the power receiving device coupled to the first USB connector 121 is the charging hub (power receiving device 112) that can receive the power through a plurality of VBUS pins (Step S405). In Step S404, if the SBU1 pin and the SBU2 pin are not active (if NO), the power supply device determines that the power receiving device coupled to the first USB connector 121 is not the charging hub that can receive the power through a plurality of VUBS pines (Step S409). Following Step S409, the power supply device starts communication based on PD.

Following Step S405, the port number detection unit 123 determines whether any one of the number notification pins of TX1±, RX1± or any one of the number notification pins of TX2±, RX2± is active (Step S406). In Step S406, if one of the number notification pins is active (if YES), the port number detection unit 123 identifies the port number of the downstream port 132 corresponding to the active pin of the number notification pins (Step S407). The port number identified by the port number detection unit 123 is notified to the VBUS selection unit 125. Following Step S407, the VBUS selection unit 125 starts outputting power to the VBUS pin corresponding to the identified port number (Step S408). Then, the power supply device 311 continues the power output state in Step S403 and ends the process.

As described above, the power supply device 311 has the PD controller 326. Thus, when a power receiving device is coupled to the first USB connector 121 of the power supply device 311, and if the high current support determination unit 122 of the power supply device 311 determines that the coupled power receiving device is not the charging hub (power receiving device 121), it is possible to determine whether or not the coupled power receiving device is the device that supports PD based on the process flow of PD. The PD controllers, which are provided in the power supply device 311 and in the power receiving device that supports PD, communicate with each other, for example, through the signal line CC included in the connection cable that conforms to the USB Type-C standard or through the power supply line VBUS, to negotiate for power control. In accordance with the result of the negotiation, the VBUS output part 125b supplies power to the power receiving device through the VBUS pin. In this way, the power supply device 311 can appropriately supply power also to the power receiving device that supports PD.

While the invention made by the present inventors has been concretely described based on exemplary embodiments, the present invention is not limited to the specific exemplary embodiments. It goes without indicating that various modifications and variations can be made without departing from the scope of the present invention. For example, in the embodiments described above, the power is supplied through the A4 pin of the VBUS pins to operate the power receiving device, but the present invention is not limited to the exemplary embodiments. It is also possible to supply power through a VBUS pin other than the A4 pin to operate the power receiving device.

What is claimed is:

1. A power supply system comprising:
a power supply device comprising a first USB connector that conforms to the USB Type-C standard; and
a power receiving device comprising a second USB connector that conforms to the USB Type-C standard,
wherein the second USB connector has a high current notification pin to notify that it is possible to receive power at a high current greater than a predetermined reference current,
wherein, when the second USB connector is coupled to the first USB connector, the power receiving device notifies the power supply device indicating that it is possible to receive power at a high current greater than the predetermined reference current, through the high current notification pin,
wherein, when receiving the notification from the power receiving device of the fact that it is possible to receive power at a high current, the power supply device determines that it is possible to start power supply to the power receiving device at a high current,
wherein the power receiving device further comprises a plurality of downstream ports for device connection in accordance with the USB Type-C standard,
wherein the second USB connector further comprises a number notification pin to notify of a number of a downstream port that needs charging,
wherein, when the second USB connector is coupled to the first USB connector, the power receiving device detects the number of the downstream port that needs charging of the downstream ports, and notifies the power supply device of the number of the downstream port that needs charging, through the number notification pin,
wherein a plurality of VBUS pins in the first USB connector are allocated to supply power to each of the downstream ports in the power receiving device, and
wherein, when receiving the notification from the power receiving device indicating the number of the downstream port that needs charging, the power supply device starts power supply to the downstream port that needs charging in the power receiving device, through the VBUS pin corresponding to the number of the downstream port in the first USB connector.

2. The power supply system according to claim 1,
wherein, when the second USB connector is coupled to the first USB connector, the power receiving device activates the high current notification pin.

3. The power supply system according to claim 1,
wherein, when detecting the number of the downstream port that needs charging of the downstream ports, the power receiving device activates the number notification pin corresponding to the number of the downstream port that needs charging.

4. The power supply system according to claim 1,
wherein the first USB connector and the second USB connector are coupled through a cable that conforms to the USB Type-C standard,
wherein the cable comprises a plurality of power supply lines VBUS corresponding to each of the downstream ports in the power receiving device.

5. A power receiving device comprising:
a second USB connector comprising a high current notification pin to notify that it is possible to receive power at a high current greater than a predetermined reference current, in accordance with the USB Type-C standard;
a high current notification unit that, when the second USB connector is coupled to a first USB connector that conforms to the USB Type-C standard in a power supply device, notifies the power supply device of the fact that it is possible to receive power at a high current greater than a predetermined reference current, through the high current notification pin; and
a plurality of downstream ports,
wherein the downstream ports are associated with each of a plurality of power supply pins in the second USB connector, and
wherein the downstream port is supplied with power through a corresponding power supply pin.

6. The power receiving device according to claim 5,
wherein the second USB connector further comprises a number notification pin to notify of a number of a downstream port that needs charging,
wherein the power receiving device further comprises:
a plurality of downstream ports for device connection in accordance with the USB Type-C standard; and
a charging port notification unit that, when the second USB connector is coupled to the first USB connector, detects the number of a downstream port that needs charging of the downstream ports, and notifies the power supply device of the number of the downstream port that needs charging, through the number notification pin.

7. The power receiving device according to claim 6, wherein, when detecting the number of the downstream port that needs charging of the downstream ports, the charging port notification unit activates the number notification pin corresponding to the number of the downstream port that needs charging.

8. A power supply device comprising:
a first USB connector that conforms to the USB Type-C standard; and
a high current support determination unit that, when receiving a notification from a power receiving device comprising a second USB connector that conforms to the USB Type-C standard and is coupled to the first USB connector, indicating that it is possible to receive power at a high current greater than a predetermined reference current in the second USB connector, through a high current notification pin for notifying that it is possible to receive power at a high current greater than the predetermined reference current, determines that the power receiving device can receive the power at a high current,
wherein the power supply device further comprises:
a plurality of voltage output units provided corresponding to each of a plurality of VBUS pins in the first USB connector; and
a voltage output selection unit for controlling power output from the voltage output unit based on number notification information of a port number of a downstream port that needs to receive power in the power receiving device.

9. The power supply device according to claim 8, further comprising a controller having a function to control power supply or power receiving in accordance with USB Power Delivery.

* * * * *